US008766570B2

(12) United States Patent
Geyer et al.

(10) Patent No.: US 8,766,570 B2
(45) Date of Patent: Jul. 1, 2014

(54) METHOD FOR CONTROLLING A CONVERTER

(75) Inventors: Tobias Geyer, Auckland (NZ); Frederick Kieferndorf, Fislisbach (CH); Georgios Papafotiou, Adliswil (CH); Nikolaos Oikonomou, Baden (CH)

(73) Assignee: ABB Research Ltd, Zurich (CH)

( * ) Notice: Subject to any disclaimer, the term of this patent is extended or adjusted under 35 U.S.C. 154(b) by 177 days.

(21) Appl. No.: 13/335,206

(22) Filed: Dec. 22, 2011

(65) Prior Publication Data

US 2012/0161685 A1    Jun. 28, 2012

(30) Foreign Application Priority Data

Dec. 24, 2010  (EP) .................................... 10196987

(51) Int. Cl.
*H02P 21/00*          (2006.01)
(52) U.S. Cl.
USPC .............. 318/400.02; 318/254.1; 318/400.09; 318/400.26; 318/400.34
(58) Field of Classification Search
USPC ............. 318/400.02, 400.09, 400.26, 400.34, 318/400.35, 254.1
See application file for complete search history.

(56) References Cited

U.S. PATENT DOCUMENTS

| | | | | |
|---|---|---|---|---|
| 4,074,179 A * | 2/1978 | Kuo et al. | ...................... | 318/696 |
| 5,455,885 A * | 10/1995 | Cameron | ...................... | 388/834 |
| 5,616,993 A * | 4/1997 | Lu et al. | .................. | 318/400.09 |
| 5,739,663 A * | 4/1998 | Brown | ........................... | 318/701 |
| 6,169,677 B1 | 1/2001 | Kitahata et al. | | |
| 6,262,904 B1 | 7/2001 | Meynard et al. | | |
| 6,316,895 B1 * | 11/2001 | Ramarathnam | .......... | 318/400.02 |
| 6,469,916 B1 * | 10/2002 | Kerkman et al. | ............... | 363/41 |
| 6,577,085 B2 * | 6/2003 | Maurice et al. | .......... | 318/400.34 |
| 6,586,898 B2 * | 7/2003 | King et al. | ............... | 318/400.34 |
| 7,102,321 B2 * | 9/2006 | Edwards et al. | ......... | 318/400.26 |
| 7,282,878 B1 * | 10/2007 | Rakov et al. | ............. | 318/400.01 |
| 7,366,587 B2 * | 4/2008 | Iribe et al. | ...................... | 700/245 |
| 7,812,563 B2 * | 10/2010 | Unsworth et al. | ............ | 318/778 |
| 7,898,210 B2 * | 3/2011 | Hsieh et al. | .................... | 318/811 |
| 8,040,095 B2 * | 10/2011 | Berto | ........................ | 318/400.35 |
| 8,044,631 B2 * | 10/2011 | Dai et al. | ....................... | 318/800 |
| 8,222,845 B2 * | 7/2012 | Papafotiou et al. | ....... | 318/400.26 |
| 2001/0040438 A1 * | 11/2001 | Maurice et al. | ............... | 318/254 |
| 2002/0185926 A1 * | 12/2002 | King et al. | .................... | 310/68 B |
| 2004/0124805 A1 * | 7/2004 | Edwards et al. | .............. | 318/700 |
| 2007/0252540 A1 * | 11/2007 | Rakov et al. | ................... | 318/254 |
| 2007/0282461 A1 * | 12/2007 | Harwood | ........................ | 700/14 |
| 2008/0037300 A1 | 2/2008 | Kataoka et al. | | |
| 2008/0150471 A1 * | 6/2008 | Unsworth et al. | ............. | 318/771 |

(Continued)

FOREIGN PATENT DOCUMENTS

EP   1 070 384 B1   8/2004
EP   1 887 680 A2   2/2008

OTHER PUBLICATIONS

European Search Report issued on Jun. 16, 2011.

*Primary Examiner* — Paul Ip
(74) *Attorney, Agent, or Firm* — Buchanan Ingersoll & Rooney PC

(57) ABSTRACT

Exemplary embodiments are directed to a converter for an electrical system that is controlled in such that switching sequences for the converter, determined with respect to an optimization goal are modified such that by correcting a flux error resulting from assumptions on which the first optimization of the switching sequence is based.

13 Claims, 10 Drawing Sheets

(56) References Cited

U.S. PATENT DOCUMENTS

| | | | |
|---|---|---|---|
| 2009/0026991 A1* | 1/2009 | Boscolo Berto | 318/400.35 |
| 2009/0212733 A1* | 8/2009 | Hsieh et al. | 318/729 |
| 2010/0165674 A1* | 7/2010 | Dai et al. | 363/37 |
| 2010/0253269 A1* | 10/2010 | Papafotiou et al. | 318/400.26 |

* cited by examiner

METHOD FOR CONTROLLING A CONVERTER

RELATED APPLICATION(S)

This application claims priority under 35 U.S.C. §119 to European Patent Application No. 10196987.1 filed in Europe on Dec. 24, 2010, the entire content of which is hereby incorporated by reference in its entirety.

FIELD

The disclosure relates to power electronics, such as a converter and a method for controlling a converter for an electrical system.

BACKGROUND INFORMATION

Converters are used in electrical systems for transforming an input voltage, which can be a first DC voltage or a first AC voltage of a first frequency, into an output voltage, which can be a second DC voltage or a second AC voltage of a second frequency.

For example, if the converter is used as an inverter, the input voltage can be a DC link voltage and the output voltage can be used for supplying an electrical load such as an electrical machine with electrical current. Conversely, a converter can be used as a rectifier in which case it is connected to an electrical grid and transforms an input AC voltage into a DC output voltage.

Nearly all converters include semiconductor switches which generate the output voltage, for example for each phase of the electrical system. The switches are controlled by a controller that determines the next switching transition and applies this switching transition to the switches. The switching transition can include a set of switching states (i.e. whether the respective switch is opened or closed) and the time instant (i.e. the time point) at which these switching states are applied to the converter.

There are several possibilities for how these switching transitions can be generated by the controller.

For example, model predictive direct torque control (MPDTC) can be used for controlling internal states of the electrical system while generating the switching transitions. Internal states of an electrical drive can be the torque and the electromagnetic fluxes in the motor. In MPDTC, switching sequences, i.e. sequences of switching transitions over a certain switching horizon are optimized in real time. For example, the corresponding torque, stator flux and neutral point trajectories can be computed using an internal machine model and then an optimal switching sequence can be chosen that features the lowest switching losses or the lowest switching frequency. The first switching transition of the switching sequence can then be applied to the converter and the next sequence can be optimized online.

Direct torque control can achieve a very fast torque response, but it can lead to relatively high values of harmonic distortion of the stator currents and of the electromagnetic torque of the controlled machine for a given value of the switching frequency or of the switching losses.

Another possibility is the use of optimized pulse patterns (OPPs). Generally, an optimized pulse pattern can be a sequence of switching transitions that has been optimized with respect to a certain optimization goal. For example, optimized pulse patterns can be computed offline for all modulation indices and switching frequencies of the motor, or of any other physical system that acts as the load of the converter, and can be optimized such that the overall current distortion for a given switching frequency is minimal. The controller can select an optimized pulse pattern from a lookup table in which the optimized pulse patterns are stored and can apply the switching transitions of the selected optimized pulse pattern to the converter. However, the application of optimized pulse patterns can lead to very long transients and to harmonic excursions of the stator currents when changing the operating point: even very small changes of the operating point can lead to comparatively high excursions of the harmonic current. Such harmonic excursions can be quantified as current errors or, equivalently, as flux errors.

SUMMARY

An exemplary method for controlling a converter for an electrical system is disclosed. The method comprising the steps of: determining a switching sequence for the converter based on an actual state of the electrical system; determining an estimated flux has been determined form the actual state of the electrical system; modifying the switching sequence by altering at least one transition time of a switching transition of the switching sequence, such that a flux error based on a difference between the estimated flux of the electrical system and a reference flux of the electrical system is minimized, and applying the modified switching sequence to the converter.

An exemplary non-transitory computer-readable medium is disclosed. The computer-readable medium stores a program element for controlling a converter for an electrical system, which when in communicative contact with a computer, the computer-readable medium causes the computer to execute a method of the program element comprising: determining a switching sequence for the converter based on an actual state of the electrical system; determining an estimated flux has been determined form the actual state of the electrical system; modifying the switching sequence by altering at least one transition time of a switching transition of the switching sequence, such that a flux error based on a difference between the estimated flux of the electrical system and a reference flux of the electrical system is minimized; and applying the modified switching sequence to the converter.

An exemplary controller for controlling a converter is disclosed, comprising: means for determining a switching sequence for the converter based on an actual state of the electrical system; means for determining an estimated flux has been determined form the actual state of the electrical system; means for modifying the switching sequence by altering at least one transition time of a switching transition of the switching sequence, such that a flux error based on a difference between the estimated flux of the electrical system and a reference flux of the electrical system is minimized; and means for applying the modified switching sequence to the converter.

An exemplary converter is disclosed, comprising: a converter circuit with switches for generating an output voltage for at least one phase; a controller for controlling the switches, the controller including: means for determining a switching sequence for the converter based on an actual state of the electrical system; means for determining an estimated flux has been determined form the actual state of the electrical system; means for modifying the switching sequence by altering at least one transition time of a switching transition of the switching sequence, such that a flux error based on a difference between the estimated flux of the electrical system and a reference flux of the electrical system is minimized; and means for applying the modified switching sequence to the converter.

BRIEF DESCRIPTION OF THE DRAWINGS

The subject matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
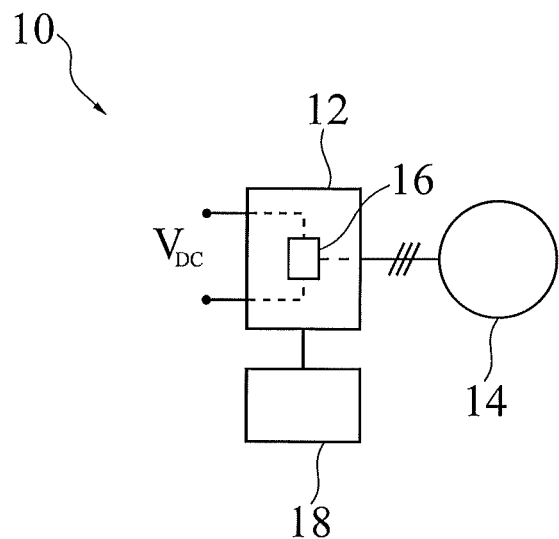
FIG. 1 schematically shows an electrical system according to an exemplary embodiment of the present disclosure.

Exemplary embodiments of the present disclosure provide a converter with fast control response, in particular with fast torque response and low harmonic distortion.

An exemplary embodiment of the present disclosure relates to a method for controlling a converter for an electrical system. An electrical system can be an electrical machine, for example a motor or a generator, or can be a power grid or any other electrical load.

According to an exemplary embodiment of the present disclosure, the electrical system can be a multi-phase system, i.e. a system which includes a plurality of phases and more preferably three phases.

According to an exemplary embodiment of the present disclosure, the converter is adapted to generate at least one output voltage from (at least one) input voltage by switches, for example semiconductor switches. For example, the converter can be part of an indirect converter and can be adapted for converting a DC input voltage in a plurality of phases of output voltage. The semiconductor switches of the converter can be high power semiconductor switches and the converter can be adapted to be operated with currents in the range up to 10 kA and voltages between 1 kV and 35 kV.

According to another exemplary embodiment of the present disclosure, the method includes the step of (a) determining a switching sequence for the converter based on an actual state of the electrical system. The switching sequence can include a sequence of switching transitions of the converter, wherein each switching transition includes a transition time. In general, a switching transition can include a time instant of the transition, i.e. the transition time or the switching instant, and a voltage level. The time instant can indicate when the converter should generate the switching transition, such that the switching states of the switches are such that the converter generates the voltage level of the switching transition.

For example, if the converter is a two-level inverter, the output voltage of the inverter can be 0 and $+V_{dc}$ and the inverter can have the voltage levels 0 and +1, for example, wherein the voltage $V_{dc}$ is the DC-link voltage. If the inverter is a three-level converter, the output voltages can be $-V_{dc}$, 0, $+V_{dc}$ with voltage levels −1, 0, +1, for example.

The time instant of the switching transition can be given with the switching angle. The time instant of the switching transition can be derived from the switching angle with the aid of the current frequency of the electrical system.

In a multi-phase system, the output voltage can be a multi-phase voltage and the switching transitions can include voltage levels for each of the phases of the output voltage.

Examples for the actual state of the electrical system are the instantaneous currents or voltages of the drive or of the grid, the estimated fluxes in the system, for example an estimated rotor flux and an estimated stator flux and an estimated torque for an electrical motor. Further examples include the DC-link voltage, and the real and reactive powers of the load. It has to be noted, that even in the case that the electrical system does not include a machine, for example in the case when the electrical system is a power grid, virtual fluxes, for example a virtual rotor flux and a virtual stator flux can be defined via impedances of the grid, a filter and/or a transformer between the converter and the grid. These virtual fluxes can be used for estimating a virtual torque.

According to an exemplary embodiment of the present disclosure, the estimation of values of the actual or current state of the electrical system can be based on a model of the system. In particular, currents and voltages of the system, for example currents and voltages in the machine, can be measured and from this, the fluxes can be calculated or determined with the aid of an internal model of the machine.

According to another exemplary embodiment of the present disclosure, the method includes the step of (b) modifying the switching sequence by altering at least one transition time of a switching transition of the switching sequence, such that a flux error based on a difference between an estimated flux of the electrical system and a reference flux of the electrical system is eliminated or minimized.

It can be possible, that the switching sequence has been generated in such a way, that a certain optimization goal is reached, for example the total harmonic distortion of the electrical system (THD) has been minimized. However, during the optimization calculation, certain assumptions with respect to the electrical systems have been made. For example, the switching sequence has been calculated such that the total harmonic distortion of the electrical system is minimized under the assumption that the electrical system is operating at steady state.

To compensate these errors, the switching sequence can be altered in such a way, that a flux error is compensated. For example, the flux error can be the difference between the estimated flux and the reference flux. The estimated flux can have been determined from the actual state of the electrical system, for example the reference flux has already been determined during the generation of the switching sequence; and the switching sequence can be altered by moving the transition times of the switching transitions, i.e. only the transition times are altered but not the voltage level of the switching transitions. In such a way, the flux error can be compensated and the optimization goal with which the switching sequence has been generated can still nearly be reached by the modified switching sequence.

An exemplary embodiment of the present disclosure is directed to the method that comprises the step of (c) applying the modified switching sequence to the converter. For example, the controller of the converter includes a memory in which an actual switching sequence is stored which the controller applies to the converter in a periodic way. When a modified switching sequence has been estimated or calculated, the actual switching sequence can be replaced by the modified switching sequence.

To summarize, it can be a gist of the disclosure that a converter for an electrical system is controlled in such that switching sequences for the converter that have been determined offline with respect to a certain optimization goal are modified in a second step in such, that the switching sequence can be optimized further in real time by correcting a flux error that can be the result of certain assumptions on which the first optimization of the switching sequence is based.

Further sources of flux error can be model uncertainties in the machine model or the grid model or DC-link fluctuations that can not be predicted exactly. During transient operation, OPPs can be altered, since these transients can not be predicted or calculated and can not be planned. Transient operations can includes the switching between different OPPs, for example from an OPP with pulse number d=6 to an OPP with pulse number d=5. Also in these cases a flux error can occur, which can have to be compensated.

According to an exemplary embodiment of the disclosure, in step (d) a transition time is altered by adding a time offset to the transition time, wherein the time offset is determined such that the flux error is at least partly compensated. In general, the flux associated with a time dependent voltage is proportional to the integral over time of the time dependent voltage. Thus, a flux error can be compensated by adding a time offset to a transition time, i.e. by shifting (advancing or delaying) the transition time. The transition time or a number of transition times can be moved in time such that the modified switching sequence has a flux that is nearly equal to the reference flux, i.e. such that the flux error is compensated.

It should be noted, that in a multi-phase system each phase of the system can have a different flux error, i.e. there is a flux error for each phase of the system and the flux error is a vector.

In general, not only one transition time will be altered, but at least some of the transition times or all of the transition times of the switching sequence can be altered. In this case it is possible, that the transition times are either modified by adding the same time offset or by adding different time offsets, i.e. each transition time can have an associated time offset that is different to the time offset of another transition time. Adding the same time offset to several transitions times can simplify the calculations.

According to another exemplary embodiment of the present disclosure, an overall time offset is derived from the flux error. In the case of a multi-phase system, there can be an overall time offset for each phase of the system. The overall time offset can be (at least partly) distributed to a number of time offsets for different transition times, such that constraints on the switching sequence are respected.

In general, it is not possible to arbitrarily alter the transitions times of the switching sequence. For example, there can be the constraint, that the order of the switching transitions should not be modified. Thus, the size of the time offset (which also can be negative) of one switching sequence can be limited such that the switching transition is not moved beyond its neighboring switching transitions. Further, there can be lower and upper limits for the transition times, for example the first transition time can not be smaller than the actual time instant.

According to yet another exemplary embodiment of the present disclosure, time offsets for transition times are determined such that the time offsets are minimized and constraints of the switching sequence are respected. In the case that the time offsets are minimized, i.e. the time offsets are chosen such that the maximum of the time offsets is minimal, it can be that the optimization goal that should be reached by the optimization of the unmodified switching sequence can also be nearly reached by the modified switching sequence. For example, such a minimization of time offsets can be reached with the aid of a quadratic program, since the minimization of the flux error and the minimization of the time offsets is at most quadratic in the time offsets when using quadratic penalties on the flux error and the time offsets. Under the assumption that there is only one time offset for the switching times of one phase, the quadratic program can be formulated as a so-called active set quadratic program with only a few iterations, for example two. This can lead to an optimization procedure that is computationally simple.

According to an exemplary embodiment of the present disclosure, a time offset for the first switching transition of the switching sequence is determined such that as much of the flux error as possible is corrected and constraints of the switching sequence are respected. This can be implemented by a so-called deadbeat control algorithm. In other words, an overall time offset is calculated and this time offset is distributed to the first switching transitions of the switching sequence. In case the electrical system is a multi-phase system, the deadbeat algorithm can be computationally simplified further by shortening the horizon for which the switching sequence is altered. In this context, the horizon can be defined as the number of switching transitions in the beginning part of the switching sequence that can be modified by the optimization procedure. The horizon can be chosen such that only two phases have switching transitions within the horizon. In this case, the computation of the overall time offset can be simplified even more.

According to another exemplary embodiment of the present disclosure, in step (b), at least two switching transitions with equal switching times are inserted into the switching sequence before the switching sequence is modified. The two switching transitions can have equal voltage levels and thus make no contribution to the flux, which is proportional to the integral over the voltage, and thus in principle have no contribution to the output voltage and the state of the electrical system. However, the optimization algorithm can move the switching times of the two switching transitions and in the case that the two switching transitions have different switching times in the modified switching sequence, an additional pulse is generated. By inserting these at least two switching transitions, the modified switching sequence can be further modified.

According to an exemplary embodiment of the present disclosure, in step (a), the switching sequence is generated from a table of pre-calculated switching sequences. For example, the pre-calculated switching sequences are stored in a non-volatile or volatile memory of the controller of the converter and are read from this memory based on certain selection criteria. For example, the pre-calculated switching sequences can be so-called optimized pulse patterns (OPP). Optimized pulse pattern can be pre-calculated with respect to a certain optimization criterion, for example a low total harmonic distortion (THD). Optimized pulse patterns can be stored in the table with respect to a modulation index and a pulse number. For example, optimized pulse patterns need not be stored for the whole period of 360° but for only one quarter of the full period. Pulse patterns that exhibit quarter-wave symmetry give raise only to odd, non-even harmonics, i.e. harmonics or order 5, 7, 11, 13, 17, 19, . . . when applied to a three-phase system. From this quarter period, a single phase pulse pattern can be generated over the whole period of 360° and the switching sequence for the phases of a multi-phase system can be generated by shifting the single phase pulse pattern by the respective phase shift.

According to an exemplary embodiment of the present disclosure, the reference flux can be determined as a vector in an orthogonal reference frame. In a multi-phase system, fluxes are vectors (for example three-dimensional vectors in the case of a three-phase system). However, for example, in a three-phase system, there are only two degrees of freedom for the different voltages, since the third dimension, the zero-axis or common mode axis, does not drive any current in a star-connected load, whose star point is not connected. This fact can be used for transforming the three-dimensional flux vectors or in general every vector of the system into a two-dimensional vector. An example for such an orthogonal reference frame is the $(\alpha, \beta)$-reference frame. In this case, the $(\alpha, \beta)$-transformation can be thought of as a projection of the three-phase quantities (for example voltages, currents, flux vector components) onto two stationary axes, the $\alpha$-axis and the $\beta$-axis.

According to another exemplary embodiment of the present disclosure, the angle of the reference flux vector is based on the sum of the angle of the estimated rotor flux vector and a reference angle, wherein the reference angle is determined from the actual state of the electrical system. As already stated, the actual state of the system can include the estimated rotor flux, and estimated stator flux, the estimated torque which is proportional to the cross-product of stator flux and rotor flux, and also a reference torque. Since the two flux vectors have to fulfill the above mentioned cross-product relation, a reference angle between the two flux vectors can be determined.

According to an exemplary embodiment of the present disclosure, the reference angle can be adjusted by a feedback control loop between an estimated value of the actual state of the electrical system and a corresponding reference value. For example, the estimated value can be the estimate torque of a rotating electrical machine and the corresponding reference value can be the reference torque.

According to an exemplary embodiment of the present disclosure, the magnitude, i.e. the length, of the flux vector, for example the reference flux vector, is determined from an angle of the flux vector and the switching sequence. For example, in a first step, only the angle of the reference flux vector is calculated and in a second step, the length of the flux vector is determined. The magnitude of the flux vector can be calculated by integrating the time dependent voltage defined by the switching sequence; the upper limit of this integration can be the angle of the flux vector that already has been determined in the first step. This calculation can be done in real time, or the magnitude of the flux can be stored in a lookup table and can have been pre-calculated for each optimized pulse pattern.

However, it is also possible that a constant magnitude of the flux vector is assumed, which can be a relatively accurate estimation.

According to an exemplary embodiment, the electrical system includes a rotating electrical machine, i.e. a motor or a generator. In this case, the flux error can be a stator flux error, the estimated flux can be the estimated stator flux and the reference flux can be a reference stator flux. As already said, the estimated values can be estimated in such a way that first the currents and the voltages of the rotating electrical machine are measured and that these measured values are applied to a model of the electrical machine. The model of the electrical machine can be stored in a controller of the converter which receives the measured values as input values and outputs the estimated values as output values.

According to another exemplary embodiment, in step (a), the switching sequence can be selected based on a modulation index of the converter, the modulation index indicating a ratio between an amplitude of an input voltage of the converter and an amplitude of an output voltage of the converter. As a rule, optimized pulse patterns are selected in such a way.

According to an exemplary embodiment of the present disclosure, the modulation index is adjusted by a feedback controller between an estimated value of the actual state of the system and a corresponding reference value. For example, the estimated value can be the estimated stator flux or the estimated rotor flux of an electrical rotating machine and the reference value can be the reference stator flux or the reference rotor flux of the rotating electrical machine.

Exemplary embodiments of the present disclosure also relate to a program element (a computer program) for controlling a converter, which when being executed by at least one processor, is adapted for executing the steps of the method as described in the above and in the following. For example, the processor can be a processor of the controller.

A further exemplary embodiment relates to a computer-readable medium, in which such a program element is stored.

A computer-readable medium can include a floppy disk, a hard disk, an USB (Universal Serial Bus) storage device, a RAM (Random Access Memory), a ROM (Read Only memory), an EPROM (Erasable Programmable Read Only Memory) or a FLASH memory. A computer readable medium can also include a data communication network, e.g. the Internet, which allows downloading a program code.

It is also possible that an exemplary method of the present disclosure is implemented with a FPGA (field-programmable gate array). In general, the algorithm for executing the method can be implemented on any computational hardware including DSPs and FPGAs.

A further exemplary embodiment of the disclosure relates to a controller for controlling a converter, wherein the controller is adapted for executing the method as described in the above and in the following. The controller can include a processor and a memory with the program element to be executed on the processor. Alternatively the controller can include the FPGA.

Exemplary embodiment of the present disclosure can also relate to a converter.

According to an exemplary embodiment of the present disclosure, the converter includes a converter circuit with switches, the converter circuit being adapted for generating an output voltage for at least one phase. In the case of an inverter, the output voltage can correspond to different voltage levels generated by switching states of the switches.

According to an exemplary embodiment of the present disclosure, the converter includes a controller for controlling the switches as described in the above and in the following.

It has to be understood that features of the method as described in the above and in the following can be features of the controller or the converter as described in the above and in the following.

If technically possible but not explicitly mentioned, an exemplary embodiment can include combinations of various embodiments of the disclosure described above and in the following can be exemplary embodiments of the method and the devices.

To summarize, the control method as described in the above and in the following can select the converter switch positions to achieve the following.

The machine, load or grid quantities can be controlled around their reference values. For an electrical machine, these quantities can include the electromagnetic torque and the magnitude and spatial orientation of the stator flux vector. For a grid connected converter, these quantities can be the active and reactive power, or the DC-link voltage and the reactive power (or current).

At steady-state operating conditions and for a given switching frequency of the converter semiconductor devices (i.e. the switches), a very low current distortion close to the theoretical lower limit can be achieved. Such a small current distortion can be obtained by computing OPPs offline so as to minimize the total harmonic distortion (THD) of the current for a given switching frequency, or equivalently, for a given number of switching events over one fundamental period of rotation of the stator voltage space vector (pulse number).

During transient operating conditions, and in the presence of external disturbances, the machine or grid quantities can be controlled very rapidly. Specifically, e.g. during a step change of the reference (setpoint) value of the electromagnetic torque, or during a step change of the load torque, a very short response time can be achieved that can be similar to the one achieved by direct torque control. The same applies to the case when switching between different OPPs. Such performance can be in the range of a few ms.

These and other aspects of the disclosure should be apparent from and elucidated with reference to the embodiments described hereinafter.

FIG. 1 schematically shows an electrical system according to an exemplary embodiment of the present disclosure. FIG. 1 illustrates an electrical system 10 with a converter 12, in particular an inverter 12, and a rotating electrical machine 14 to which the inverter 12 is connected. The inverter 12 can be part of an indirect converter and can be connected to the DC-link of the converter with a DC voltage $V_{DC}$. The inverter 12 includes an inverter circuit 16 with switches that transform the DC voltage into a three-phase AC voltage that is supplied to the electrical machine 14. Alternatively, the inverter 12 can be an inverter that generates only a one-phase AC voltage. In general, the inverter 12 can be a multi-phase or multi-level inverter and the system 10 can be a multi-phase system.

The inverter 10 includes a controller 18 with an FPGA or a processor that is adapted to execute the optimization method or the optimization algorithm as described in the above and in the following. The controller 18 is adapted to execute feedback control, i.e. receives input variables, for example the voltages and the currents in the electrical machine 14 or the speed of the electrical machine 14, generates switching sequences and applies these switching sequences to the inverter switches 16, which then influence the input variables.

Figure 2:
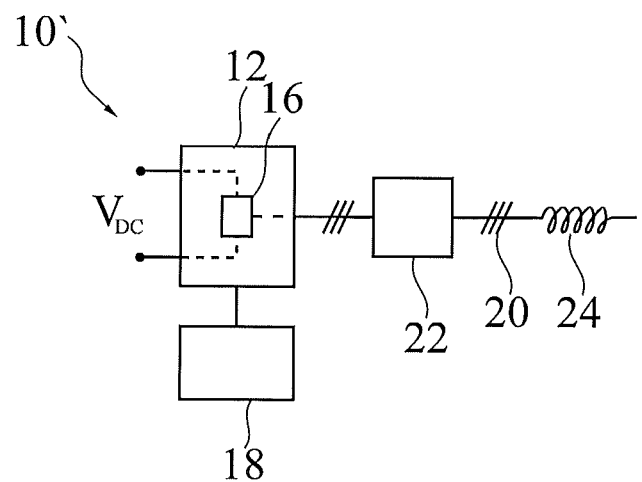
FIG. 2 schematically shows an electrical system according to a further exemplary embodiment of the present disclosure.

FIG. 2 schematically shows an electrical system according to a further exemplary embodiment of the present disclosure. FIG. 2 illustrates an alternative embodiment of an electrical system 10' with the converter 12, in particular a rectifier 12. As shown in FIG. 2, the rectifier 12 is connected to a grid 20 via a transformer and a filter 22, for example an L, LC or LCL filter. For controlling the inverter 12, the controller 18 receives the voltages and the currents in the grid 20. In this case, the control model of the electrical machine 14 can be replaced by a control model of the grid 20 including a virtual grid impedance 24 and an impedance of the transformer and filter 22.

Figure 3:
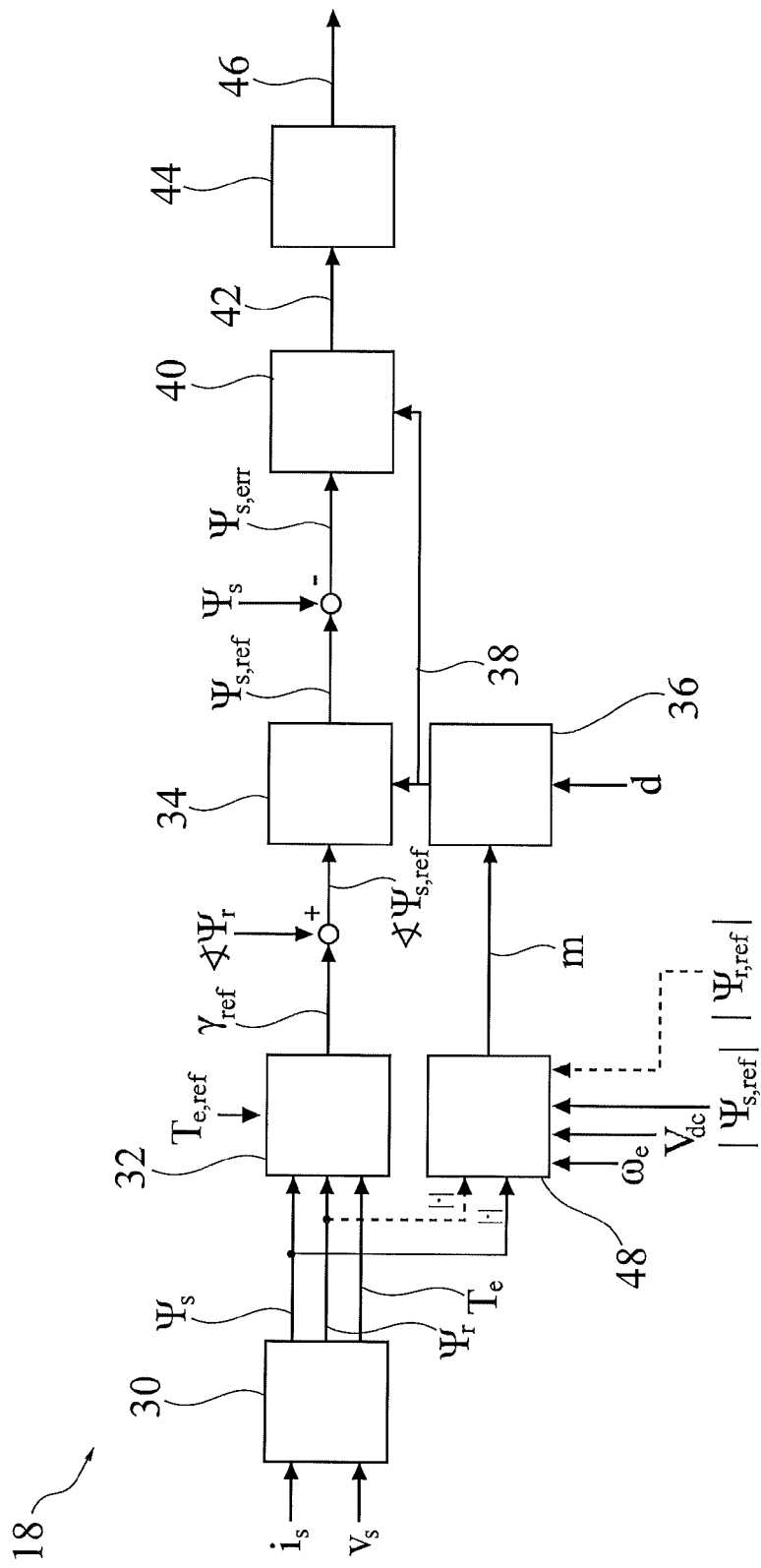
FIG. 3 shows schematically the design of a controller according to an exemplary embodiment of the present disclosure.

FIG. 3 shows schematically the design of a controller according to an exemplary embodiment of the present disclosure. In particular, FIG. 3 shows schematically the design of the controller 18.

The controller 18 includes a flux estimation module 30 that receives the instantaneous currents $i_S$ and the instantaneous voltages $v_S$ from the electrical machine 14 or the grid 24. In some instances, the instantaneous voltages $v_S$ can not be measured. They can be reconstructed to good approximation from the known switching state signals and the measured DC-link voltage. The flux estimation module 30 includes a model of the electrical machine 14 or the electrical grid 24 and is adapted to estimate the actual fluxes $\psi_s$, $\psi_r$ from instantaneous currents $i_S$ and the instantaneous voltages $v_S$. In the case of a grid 20, the fluxes $\psi_s$, $\psi_r$ can be virtual fluxes.

In the case of an electrical rotating machine, $\psi_s$ is the estimated stator flux and $\psi_r$ is the estimated rotor flux. The estimated torque $T_e$ is proportional to the cross-product of the fluxes $\psi_s$, $\psi_r$.

The fluxes $\psi_s$, $\psi_r$ and the torque $T_e$ are supplied to a reference angle module 32 that determines the reference angle $\gamma_{ref}$, the angle between the estimated rotor flux $\psi_r$ and the reference stator flux $\psi_{s,ref}$. Also, the reference torque $T_{e,ref}$ can be used for determining the reference angle $\gamma_{ref}$.

The angle of the reference stator flux $\psi_{s,ref}$ is then the sum of the angle of the estimated rotor flux $\psi_r$ plus the reference angle $\gamma_{ref}$. The angle of the reference stator flux $\psi_{s,ref}$ is input into the reference flux module 34, which iR determines the magnitude of the reference stator flux $\psi_{s,ref}$. In the determination of the magnitude of the reference stator flux $\psi_{s,\,ref}$, the selected switching sequence 38 from the OPP pattern selector 36 can be used.

The stator flux error $\psi_{s,\,err}$ is the difference between the reference stator flux $\psi_{s,\,ref}$ and the estimated stator flux $\psi_s$. The stator flux error $\psi_{s,\,err}$ and the selected switching sequence 38 are input to the error minimization module 40 which modifies and optimizes the switching sequence 38 such that the stator flux error $\psi_{s,\,err}$ is minimized.

The modified switching sequence 42 is input into a switch position module 44 that generates a sequence of switch positions 46 from the modified switching sequence 42. The switching sequence 42 only contains the switching transitions with the voltage levels, the inverter 12 should produce. The switch position module 44 converts the voltage levels of the switch transitions into switch positions including the switching states of the switches that produces the respective voltage level.

For selecting the switching sequence 38, the OPP pattern selector 36 receives the modulation index m from the modulation index module 48 and the pulse number d. The pulse number d is the number of pulses of the OPP and depends on the rotational frequency of the motor 14 and the desired switching frequency.

The modulation index m is determined by the module 48 from the stator frequency $\omega_e$ and the DC-link voltage $V_{DC}$. Optionally the length of the estimated stator flux $\psi_s$ and the length of the reference stator flux $\psi_{s,\,ref}$ or the length of the estimated rotor flux $\psi_r$ and the length of the reference rotor flux $\psi_{s,\,ref}$ can be used for a feedback control of the modulation index m.

The functional modules 30, 32, 34, 36, 40 and 48 of the controller 18 can be implemented as programmed software modules or procedures, respectively. Alternatively, the functional modules can be implemented fully or partially in hardware.

In the following, aspects of the calculation of OPPs (optimized pulse patterns) and the functionality of the module 36 are described with respect to FIGS. 4 to 9.

Figure 4:
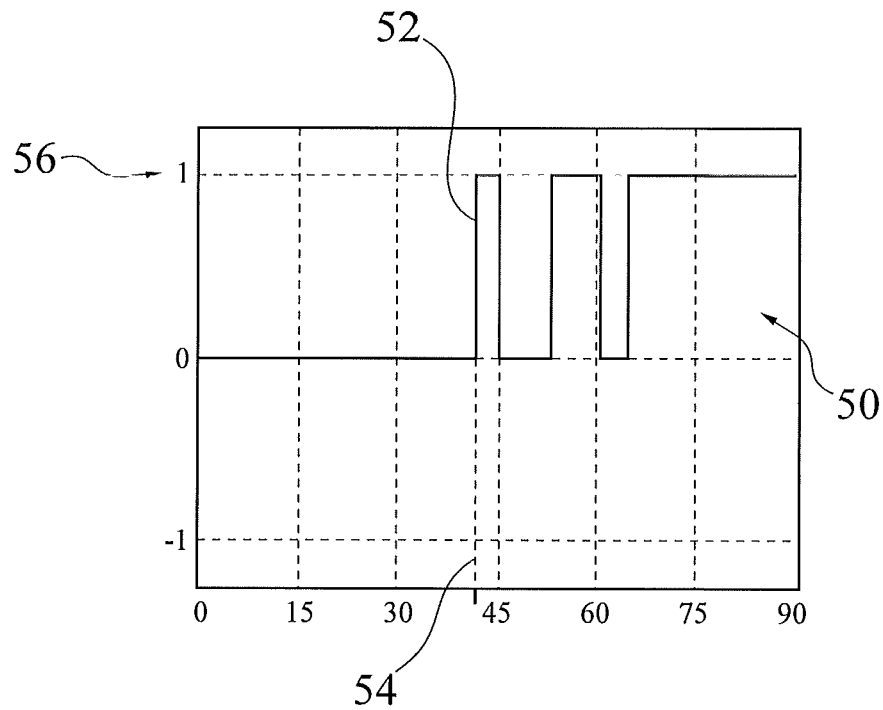
FIG. 4 shows a diagram of an OPP according to an exemplary embodiment of the present disclosure.

FIG. 4 shows a diagram of an OPP according to an exemplary embodiment of the present disclosure. FIG. 4 shows a diagram with an OPP 50 with five switching transitions 52, i.e. with pulse number d=5. In the diagram, the switching angle 54 of the switching transitions 52 is depicted on the x-axis of the diagram and the voltage levels 56 of the switching transitions 52 are depicted on the y-axis of the diagram. In the present case, the OPP 50 is an OPP for a three level inverter 12 with three voltage levels −1, 0, 1, for example. The OPP 50 is a single-phase pulse pattern with d=5 primary switching angles 54 (switching angles over the range 0 to 90 degrees) for the three-level inverter 12. The OPP 50 includes a switching sequence u=[0 1 0 1 0 1] as a function of the five switching angles 54 and for a modulation index of m=0.6. Only a quarter of the full fundamental period is shown in FIG. 4.

Figure 5:
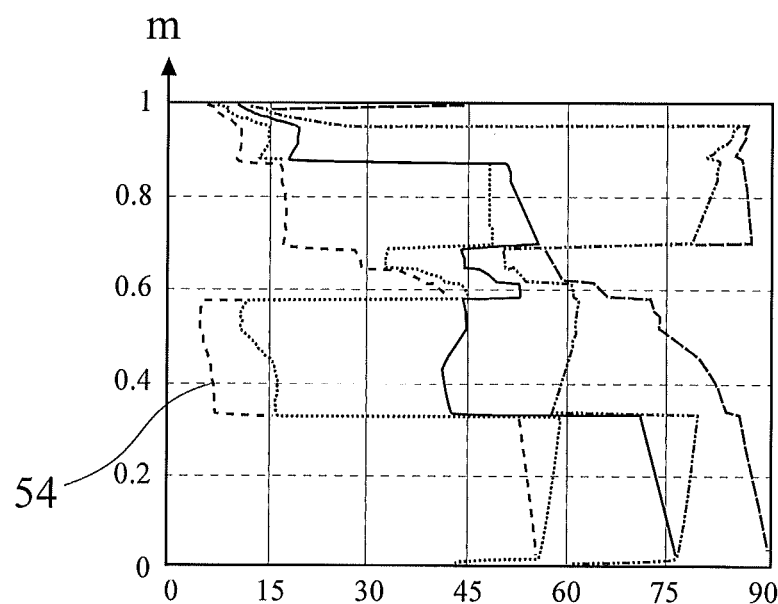
FIG. 5 shows a diagram with switching angles as a function of the modulation index according to an exemplary embodiment of the present disclosure.

FIG. 5 shows a diagram with switching angles as a function of the modulation index according to an exemplary embodiment of the present disclosure. FIG. 5 illustrates a diagram with the primary switching angles 54 as a function of the modulation index m that is depicted on the y-axis of the diagram. The voltage levels of FIG. 4 and the switching angles of FIG. 5 depend on the modulation index m. They are stored in a lookup table for the pulse number d=5 and the OPP 50 can be read out by the module 36, when an OPP with pulse number d=5 should be selected.

Figure 6:
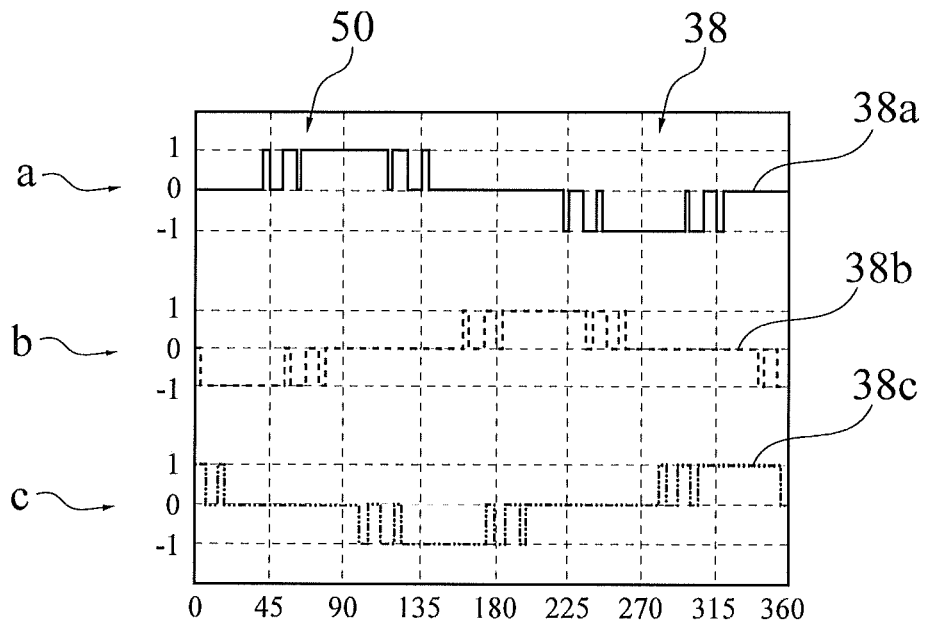
FIG. 6 shows a diagram with a switching sequence according to an exemplary embodiment of the present disclosure.

FIG. 6 shows a diagram with a switching sequence according to an exemplary embodiment of the present disclosure.

FIG. 6 illustrates a diagram with a three-phase pulse pattern 38 or switching sequence 38 for the modulation index m=0.6 and pulse number d=5, which has been generated by the module 36 from the OPP 50.

When computing OPPs offline, quarter-wave symmetry can be imposed on a single-phase pulse pattern 50. The pulse patterns 38a, 38b, 38c of the phases a, b, and c of the three-phase system 10 can be obtained by shifting the single-phase pattern 50 by 0, 120 and 240 degrees, respectively. As a result, the three-phase pulse pattern or switching sequence 38 over 360 degrees is fully characterized by the single-phase pattern 50 over 90 degrees.

As already said the OPPs 50 can be computed offline and stored in the module 36. To compute the single-phase OPP 50 over 90 degrees, the number of primary switching angles (the pulse number) d and the single-phase switching sequence u is fixed. An objective function is chosen for optimization: a common selection is the weighted sum of the squared differential-mode voltage harmonics, which is equivalent to the current THD. For every value of the modulation index m, this objective function is minimized by optimizing over the switching angles 54. This optimization step is repeated for all modulation indices m leading to a set of switching angles 54 that defines the OPP 50 as a function of the modulation index, as shown in FIGS. 4 and 5.

Starting from the single-phase OPP 50 over 90 degrees (shown for example in FIG. 4), the three-phase switching sequence 38 is directly obtained by applying quarter-wave symmetry and by shifting the phase a pattern, 38a, by 120 and 240 degrees to produce patterns for phase b and c: 38b, 38c respectively. This leads to the switching sequence 38 shown in FIG. 6.

In the following, properties of the steady-state stator flux obtained with the OPP 50 are explained.

Let P denote the peak-invariant transformation (matrix) from the (a, b, c)-reference frame to the stationary orthogonal ($\alpha$, $\beta$)-reference frame, and let $V_{dc}$ denote the total DC-link voltage of the power converter. Considering an electrical machine 14 connected to the inverter 12 and neglecting the stator resistance of the machine 14, the steady-state stator flux trajectory in the ($\alpha$, $\beta$)-reference frame that corresponds to the OPP 50 is obtained by integrating the switching sequence 38 (i.e. u($\alpha$) in formula (1)) defined by the OPP 50 over the angle range [0, $\delta$], where $\delta$ is the actual angular position of the voltage vector.

$$\Psi_s(\delta) = \Psi_s(0) + \frac{V_{dc}}{2} \int_0^\delta P \cdot u(\alpha) d\alpha. \quad (1)$$

Figure 7:
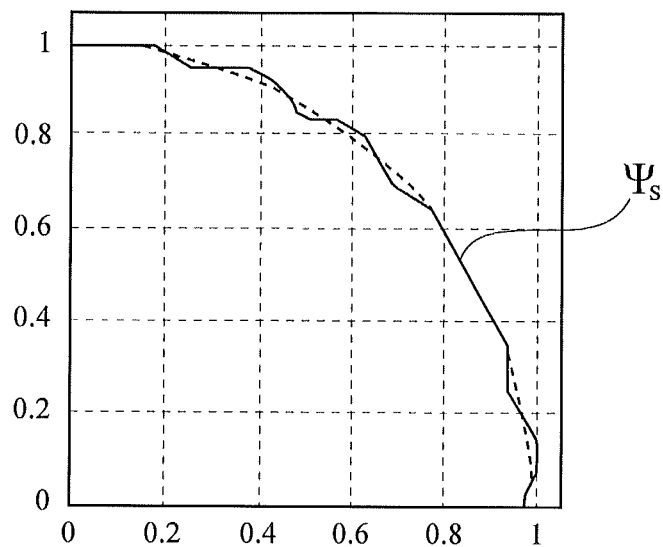
FIG. 7 shows a diagram with a steady-state stator flux trajectory according to an exemplary embodiment of the present disclosure.
Figure 8:
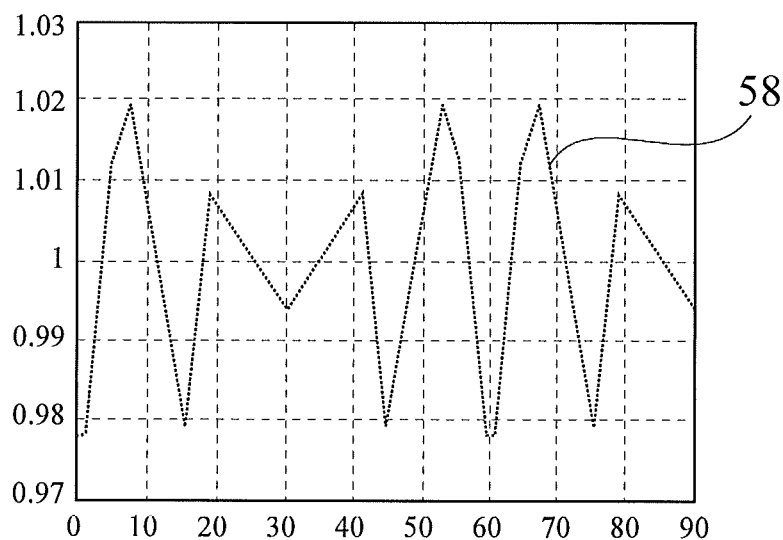
FIG. 8 shows a diagram with the amplitude of the stator flux of FIG. 7 in accordance with an exemplary embodiment of the present disclosure.
Figure 9:
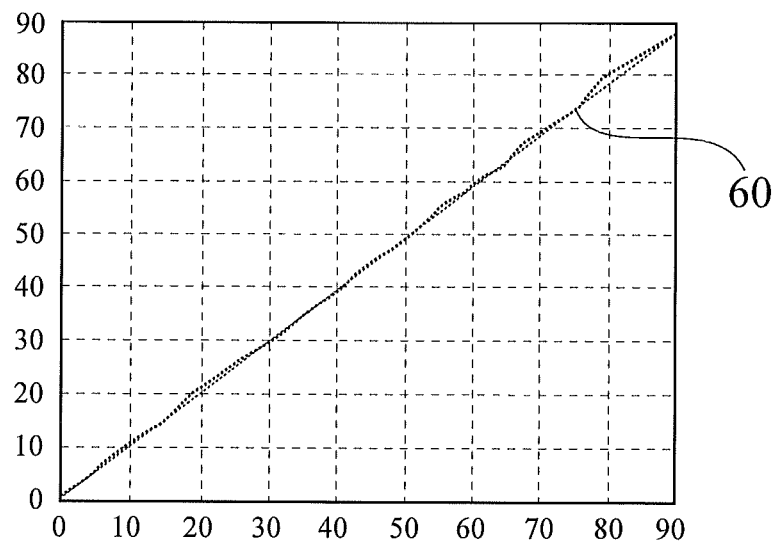
FIG. 9 shows a diagram with the phase angle of the stator flux of FIG. 7 in accordance with an exemplary embodiment of the present disclosure.

FIG. 7 shows a diagram with a steady-state stator flux trajectory according to an exemplary embodiment of the present disclosure. In this example, the resulting steady-state stator flux trajectory $\psi_s$ in the ($\alpha$, $\beta$)-reference frame is shown in FIG. 7 over 90 degrees. The average amplitude of the stator flux trajectory $\psi_s$ is one (dashed line). Yet it is obvious from FIG. 7 that the trajectory amplitude of the stator flux vector 58 oscillates around one, as shown in FIG. 8. FIG. 8 shows a diagram with the amplitude of the stator flux of FIG. 7 in accordance with an exemplary embodiment of the present disclosure. Note that the phase angle of the stator flux vector 60 also oscillates around its nominal value, as can be seen in FIG. 9. FIG. 9 shows a diagram with the phase angle of the stator flux of FIG. 7 in accordance with an exemplary embodiment of the present disclosure. This ripple results from variations in the stator frequency $\omega_e$, which results from applying voltage vectors of different and discrete magnitudes including zero vectors. The amplitude and angular ripple of the stator flux vector 58, 60, which repeats itself every 60 degrees and also exhibits a 30 degree symmetry, gives raise to the discrete frequency spectrum of the voltage harmonics.

If the voltages applied to the motor 14 would be sinusoidal voltages, the stator flux $\psi_s$ would follow the dashed circle shown in FIG. 7 and the curves 58, 60 would be straight lines. No amplitude or phase errors would be present. Since the inverter 12 is only designed to generate discrete voltage levels (see for example FIG. 6), the OPP 50 is optimized such that the amplitude and phase errors are minimized. However, the minimization is done under the assumption of a steady-state operation of the motor 14, for example no frequency or load changes.

In particular, during sudden or steep changes of the operating conditions of the motor 14, this assumption is no longer applicable and the amplitude or phase errors are no longer minimal for the selected OPP 50 or switching sequence 38. However, it is reasonable to assume that the switching sequence 38 which is optimal with respect to steady-state operation is a good candidate for generating a switching sequence 42 that is suitable for transient operation.

The closed loop control scheme is shown in FIG. 3. The sequence of switch positions 46 is applied by the controller 18 to the converter 12, which generates the respective output voltages for the electrical machine 14. Changing operating conditions influence the instantaneous current $i_S$ and the instantaneous voltage $v_S$ which are the input parameters of the controller 18. Thus, closed loop control is realized.

In other words, fast closed-loop control of an electrical machine 14 based on OPPs 50 can be achieved by controlling the stator flux vector $\psi_s$ along its reference trajectory. This objective can be achieved by directly manipulating the switching transitions 52 of the OPP 50. As a result, the stator flux vector $\psi_s$ is controlled such that the electrical machine 14 is adequately magnetized, such that the commanded electromagnetic torque $T_{e,ref}$ is produced by the electrical machine 14.

In the following the control problem for minimizing the stator flux error $\psi_{s,err}$ and the functionality of the modules of FIG. 3 will be described.

Figure 10:
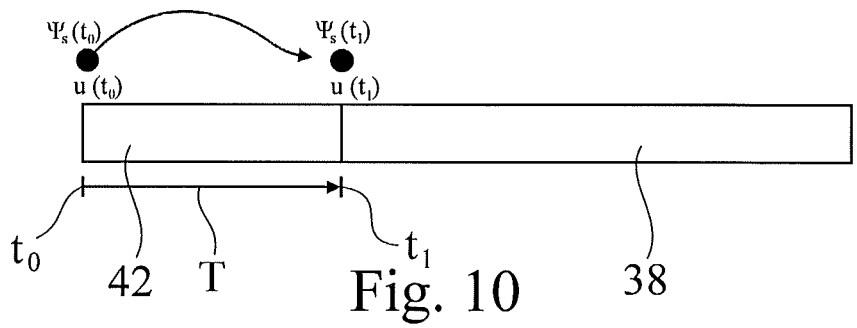
FIG. 10 shows a diagram explaining the control problem of the method according to an exemplary embodiment of the present disclosure.

The resulting control problem can be formulated as a constrained optimal control problem with a so-called receding horizon policy or, equivalently, as a model predictive control problem. FIG. 10 shows a diagram explaining the control problem of the method according to an exemplary embodiment of the present disclosure.

The key idea is to use a horizon of finite length T and to drive the stator flux vector $\psi_s$ over this horizon to its desired position using transient pulse patterns or modified switching sequences 42 thus correcting the stator flux error. From the end of the horizon T onwards, steady-state operation is assumed. In particular, it is assumed that from t+T onwards the original, i.e. the steady-state pulse pattern or the unmodified switching sequence 38, will be applied.

The model predictive control of OPPs can be interpreted as a boundary control problem as illustrated in FIG. 10. Starting at time $t_0$ with the switch position $u(t_0)$ and the stator flux $\psi_s(t_0)$, a modified switching sequence 42 over the time-interval T is to be derived; this modified switching sequence 42 drives the stator flux vector $\psi_s$ to the terminal stator flux $\psi_s(t_1)$. Moreover, the modified switching sequence 42 is to lead to the terminal switch position $u(t_1)$. In this boundary control problem, $u(t_0)$ and $\psi_s(t_0)$ are the initial conditions, while $u(t_1)$ and $\psi_s(t_1)$ are accordingly the terminal conditions.

The time-interval T is referred to as the horizon $T=t_1-t_0$. From $t_1$ onwards, the steady-state pulse pattern is assumed to be applied.

The algorithm for modifying the switching sequence explained in the following assumes that the electrical system 10 is always in a transient operating condition, i.e. it tries to minimize the flux error all the time. Thus, the algorithm is always working at $t_0$ and the time point $t_1$ is practically never reached.

The modified switching sequence 42 is specified to be optimal in the sense that it minimizes the current and/or torque total harmonic distortion (THD). The modified switching sequence 42 can also minimize the switching losses of the power inverter switches 16, if desired. The torque and the stator flux magnitude can have to be kept near their references. In addition, the stator currents can have to be kept below their upper (positive) bounds and above their lower (negative) bounds. The current limit can be a constraint.

The algorithm assumes that small modifications of the switching sequence 38 lead only to small modifications with respect to the optimality of the switching sequence 38 that has been optimized offline. In case the stator flux error $\psi_{s,err}$ is small with respect to the stator flux $\psi_s$, this condition is fulfilled.

Thus, the algorithm assumes that the stator flux error $\psi_{s,err}$ is small and that in order to remove the stator flux error $\psi_{s,err}$ over the horizon T only small corrections of the switching transitions 52 (switching instants) are specified. These small variations in the switching transitions 52 are assumed to not (significantly) affect the optimality of the OPP 50, or equivalently, to not deteriorate the current total harmonic distortion (THD). Thus, the steady-state OPP 50 can be used as a baseline pattern when deriving the switching sequence 42 (or transient OPP) thus greatly simplifying the boundary control problem. Specifically, the objective can then be to control the stator flux vector $\psi_s$ along its given reference trajectory in the ($\alpha$, $\beta$)-reference frame by modifying as little as possible the switching transitions 52 of the OPP 50 within the horizon T. This control concept can be referred to as Model Predictive Pulse Pattern Control (MP$^3$C).

Figure 11:
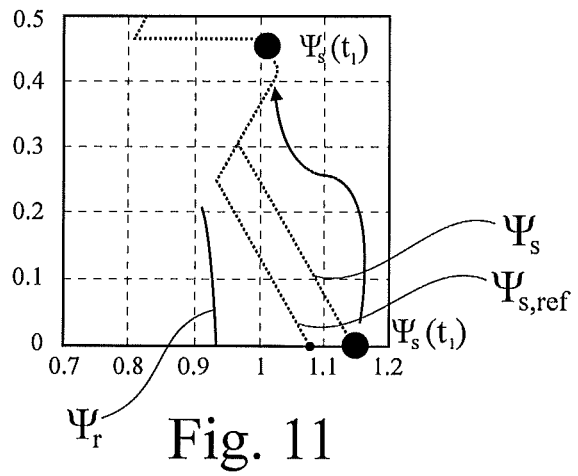
FIG. 11 shows a diagram with stator and rotor flux trajectories according to an exemplary embodiment of the present disclosure.
Figure 12:
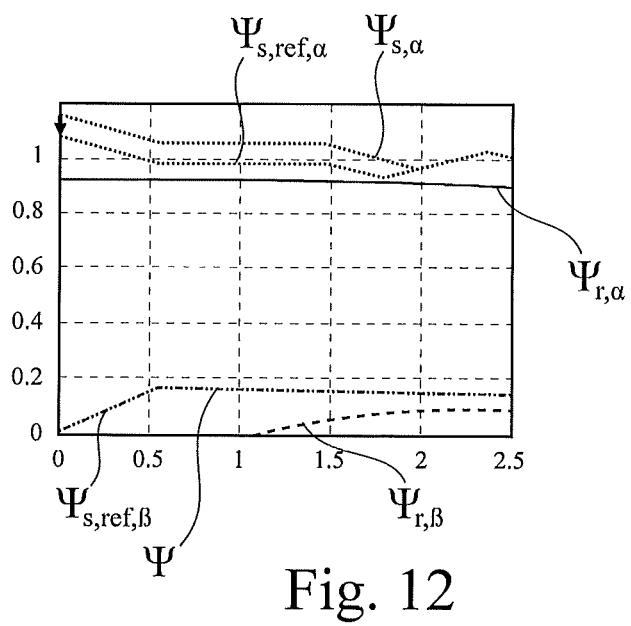
FIG. 12 shows a diagram with stator and rotor flux trajectories according to an exemplary embodiment of the present disclosure.
Figure 13:
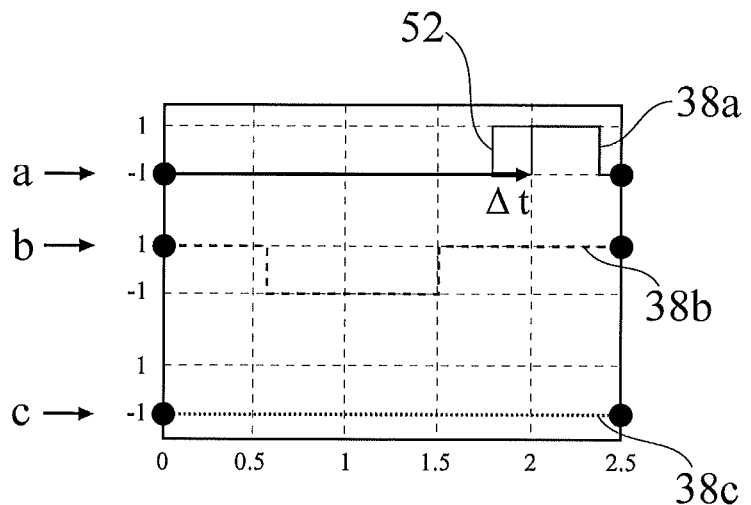
FIG. 13 shows a diagram with a switching sequence according to an exemplary embodiment of the present disclosure.

An example for this concept is given in FIGS. 11 to 13, which show a model predictive pulse pattern control for a two-level inverter.

FIG. 11 shows a diagram with stator and rotor flux trajectories according to an exemplary embodiment of the present disclosure. FIG. 11 illustrates a diagram with the stator and rotor fluxes in the ($\alpha$, $\beta$)-reference frame. In FIG. 11, the shift of the actual or estimated stator flux $\psi_s$ to the reference stator flux $\psi_{s,ref}$ with corrected stator flux error $\psi_s$ is indicated.

FIG. 12 shows a diagram with stator and rotor flux trajectories according to an exemplary embodiment of the present disclosure. FIG. 12 shows a diagram with the normalized $\alpha$- and $\beta$-components of the stator flux vectors $\psi_s$, $\psi_{s,ref}$ and the rotor flux vector $\psi_r$ as a function of time in ms, in particular with a horizon from 0 ms to 2.5 ms. The trajectories in FIG. 11 are also constrained to this horizon, thus the trajectory of $\psi_r$ stops in the middle of the diagram.

FIG. 13 shows a diagram with a switching sequence according to an exemplary embodiment of the present disclosure. FIG. 13 illustrates a diagram with the three-phase switch positions 38*a*, 38*b*, 38*c* as a function of the time in ms and a correction (time offset) $\Delta t$ in a switching transition 52 in phase a.

Figure 14:
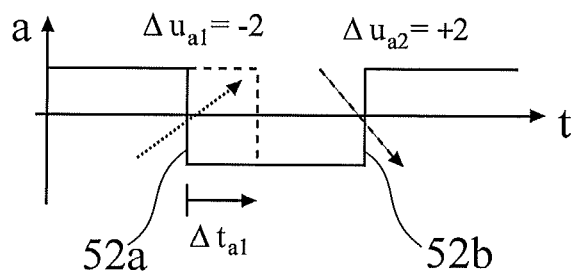
FIG. 14 shows a diagram explaining the effect of a shift of a transition time according to an exemplary embodiment of the present disclosure.

FIG. 14 shows a diagram explaining the effect of a shift of a transition time according to an exemplary embodiment of the present disclosure. FIG. 14 illustrates a diagram explaining the effect of altering the transition time 54 of a switching transition 52. In particular, consider one phase, e.g. phase a, and an inverter 12 with the voltage levels u=[−1, 1] (i.e. a two-level inverter), u=[−1, 0, 1] (i.e. a three-level inverter) or u=[−1, −0.5, 0, 0.5, 1] (i.e. a five-level inverter). Let $V_{DC}$ denote the total DC-link voltage. Then, shifting a switching transition 52 by Δt leads to a change in the (a, b, c) stator flux vector by $$\Delta\Psi_s(\Delta t) = \frac{V_{dc}}{2} \Delta u \cdot \Delta t, \tag{2}$$

where Δt is given in pu (normalized units). An example based on a two-level inverter is shown in FIG. 14. Here, delaying the negative switching transition 52a with $\Delta u_{a1}=-2$ in phase a increases the volt-seconds in this phase and the stator flux accordingly, while advancing the switching transition has the opposite effect, i.e. it decreases the flux amplitude in the direction of phase a.

Figure 15:
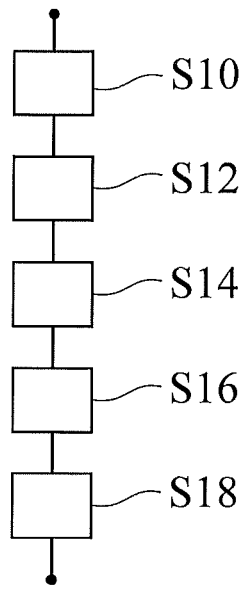
FIG. 15 shows a flow diagram of an optimization method according to an exemplary embodiment of the present disclosure.

Hereafter, the MP³C algorithm is summarized with respect to FIG. 15. FIG. 15 shows a flow diagram of an optimization method according to an exemplary embodiment of the present disclosure. The algorithm can include five steps. It operates in the discrete time domain and it is activated every $T_s$ seconds. The sampling interval $T_s$ can be 25 microseconds or 50 microseconds, for example. The control problem is formulated and solved in the stationary orthogonal reference frame (α, β).

In a step S10, at time-step k, the module 30 estimates the stator and the rotor flux vectors in the stationary reference frame yielding the estimated stator flux vector $\Psi_s[\Psi_{s\alpha}\Psi_{s\beta}]$ and the estimated rotor flux vector $\Psi_r=[\Psi_{r\alpha}\Psi_{r\beta}]$. Let angle (Ψ) denote the angular position of a flux vector and |Ψ| its magnitude. The vectors $\Psi_s$ and $\Psi_r$ are estimated based on a machine model of the electrical machine 14. In case of a grid connected inverter 12, the fluxes can be based on virtual fluxes as indicated above.

The delay introduced by the controller computation time can be compensated by rotating the estimated stator flux vector $T_s$ and the estimated rotor flux vector $\Psi_r$ by $\omega_e T_s$ forward in time, i.e. angle(Ψ)=angle($\Psi_s$)+$\omega_e T_s$ and accordingly for the rotor flux vector $\Psi_r$. Here $\omega_e$ is the stator frequency of the electrical machine 14.

Figure 16:
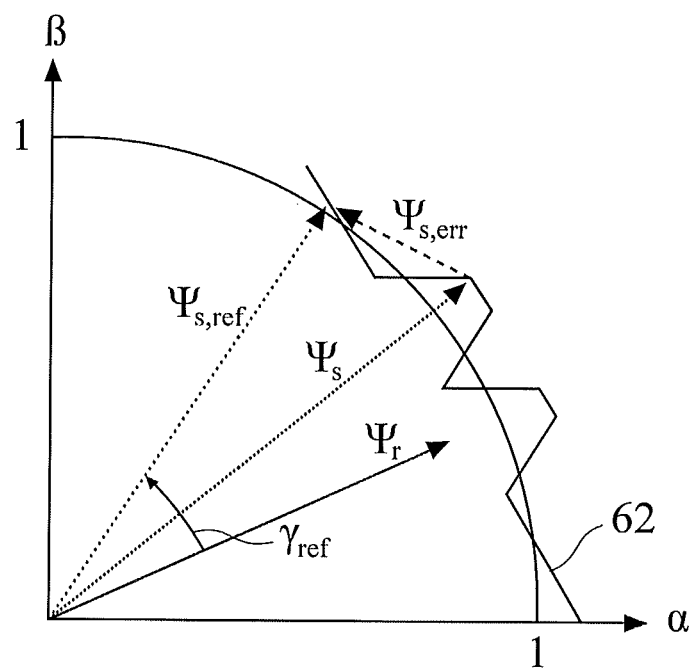
FIG. 16 shows a diagram explaining the determination of the reference stator flux according to an exemplary embodiment of the present disclosure.

In a step S12, the module 32 calculates the reference angle $\gamma_{ref}$. For a graphical summary of the derivation of this quantity please refer to FIG. 16. FIG. 16 shows a diagram explaining the determination of the reference stator flux according to an exemplary embodiment of the present disclosure. FIG. 16 is a diagram similar to the diagrams of FIGS. 7 and 11 and shows the quantities in the (α, β)-reference frame.

First, recall that the electromagnetic torque $T_e$ produced by the machine can be written as $$T_e = k_r |\Psi_s| \cdot |\Psi_r| \sin(\gamma), \tag{3}$$

where γ is the angle between the stator flux vector $\Psi_s$ and the rotor flux vector $\Psi_r$ and $k_r$ is a constant. When the machine 14 is fully magnetized, the magnitude of the reference stator flux vector $\Psi_{s,ref}$ is equal to 1 pu. Then, for a given magnitude of the rotor flux vector $|\Psi_r|$ and a given reference torque $T_{e,ref}$ the desired reference angle between the stator and rotor flux vectors is $$\gamma_{ref} = \sin^{-1}\left(\frac{T_{e,ref}}{k_r|\Psi_r|}\right). \tag{4}$$

This derivation is possible, since the rotor flux □$_r$ can be estimated very accurately. In some cases, the motor 14 even has a position sensor, which directly measures the position of the rotor and thus the angle of the rotor flux.

After that, the angle of the stator flux reference vector $\Psi_{s,ref}$ is calculated by $$\text{angle}(\Psi_{s,ref})=\text{angle}(\Psi_r)+\gamma_{ref}. \tag{5}$$

The reference stator flux vector $\Psi_{s,ref}$ is i then obtained by module 34, for example by reading out the magnitude (length) of stator flux vector $\Psi_{s,ref}$ at the angle($\Psi_{s,ref}$) from a table stored in the module 34. This table can be pre-calculated for all optimized pulse patterns. In FIG. 16, the stored values of the magnitude of the stator flux vector are indicated by the corner points of the trajectory 62 of the stator flux vector $\Psi_s$. Another possibility is to calculate the magnitude online from the selected switching sequence 38, i.e. by integrating the voltages of the switching sequence over time.

After that the stator flux error $\Psi_{s,err}$ is computed by forming the difference between the reference flux vector $\Psi_{s,ref}$ and the estimated stator flux vector $\Psi_s$, $$\Psi_{s,err}=\Psi_{s,ref}-\Psi_s. \tag{6}$$

From (6), it is evident that the error of the stator flux can be calculated directly, without the need to have a separate estimation of (i) the fundamental component of the stator flux, and (ii) of the respective harmonic content of the stator flux. The lack of the necessity to have an observer scheme that estimates (i) and (ii) in real-time adds to the simplicity and reliability of the present method. The described method can therefore be more appropriate for industrial applications when compared to state-of-the-art trajectory tracking methods.

Step S14 (see FIG. 15) is the application of the actual pattern controller, in which the reference flux module 40 modifies the switching sequence 38 over a certain horizon T so as to minimize the amplitude of the stator flux error $\Psi_{s,err}$. In other words, the modified switching sequence 42 is generated from the switching sequence 38 with the aid of the stator flux error $\Psi_{s,err}$.

The pattern controller algorithm can be available in three forms, which will be explained in the following. In particular, a control algorithm based on (1) a quadratic program (QP), (2) a control algorithm based on an approximate active set QP and (3) a deadbeat control algorithm.

Before attempting the minimization of the stator flux error $\Psi_{s,err}$, additional pulses can be inserted into the switching sequence 38. This can be advantageous when a very fast torque response is to be generated—e.g. in response to a step change of the torque command—and no suitable switching transitions are available within the observed time interval. Minimum on- and off-times of the semiconductor switches can be imposed if desired, by adding constraints accordingly to the switching time instants.

In particular, an additional pulse can be inserted by inserting a negative and a positive switching transition 52a, 52b (see for example FIG. 14), i.e. a switching transition from a higher to a lower voltage level and then the inverse switching transition (or vice versa), at the same time instants. The pattern control algorithm can then move the switching transitions as specified. If, as a result, the time instants are not equal, an additional pulse has been generated.

In step S16, the switching transitions that will occur within the sampling interval are removed from the switching sequence 42, i.e. the switching transitions that will be applied to the inverter 12. This can be achieved by updating a pointer to the look-up table that stores the switching angles of the switching sequence 42 and the respective three-phase potential values.

In step S18, the switching commands over the sampling interval are derived, i.e. the switching instants and the associated modified switching positions. In this step, a predictive balancing algorithm can be used for which switching commands over multiple sampling intervals can be specified. The modified switching sequence 42 can only contain the voltage levels and not the switching positions that generate these voltage levels. A predictive balancing algorithm can choose the switching positions in such a way that certain internal states of the inverter 12, for example the neutral point potentials, are optimized.

After that, the algorithm starts again with step S10.

As indicated above, there are different possible embodiments of the algorithm that modify the switching sequence 38 into the switching sequence 42 (see FIG. 3).

A first embodiment is an optimal control algorithm based on a quadratic program (QP).

The control problem can be formulated as a quadratic program (QP), a special type of mathematical optimization method, which minimizes the uncorrected flux error (controlled variable) and the changes in the switching instants (manipulated variable). This can be formulated by $$\min_{\Delta t} |\Delta \psi_{s,corr}(\Delta t) - \Delta \psi_{s,err}|^2 + q \Delta t^T \Delta t \quad (7)$$

s.t.

$$0 \leq t_{a1} \leq t_{a2} \leq \ldots \leq T$$

$$0 \leq t_{b1} \leq t_{b2} \leq \ldots \leq T$$

$$0 \leq t_{c1} \leq t_{c2} \leq \ldots \leq T$$

The first term of (7) is for minimizing the flux error; the second term is for minimizing the time shifts collected in a matrix $\Delta t$ with entries $\Delta t_{xi}$, where x is the phase and i is the index of the switching transition of the switching sequence 38. The weight q can be chosen very small, thus putting priority on correcting the flux.

The inequalities in (7) are the constraints on the time instant $t_{xi}$ of the switching transitions. The time instants must maintain the order of the switching transitions and must be within the horizon (i.e. between 0 and T).

In the first term of (7), $\Psi_{s,corr}(\Delta t)$ is the correction of the flux, i.e.

$$\Delta \psi_{s,corr}(\Delta t) = -\frac{1}{3} \frac{V_{dc}}{2} \begin{bmatrix} 2\sum \Delta u_{ai} \Delta t_{ai} - \sum \Delta u_{bi} \Delta t_{bi} - \sum \Delta u_{ci} \Delta t_{ci} \\ \sqrt{(3)} \sum \Delta u_{bi} \Delta t_{bi} - \sqrt{(3)} \sum \Delta u_{ci} \Delta t_{ci} \end{bmatrix} \quad (8)$$

Formula (8) is derived from formula (2) and is generalized to three phases like formula (1). The $\Delta u_{xi}$ are the switch transitions (changes in the voltage level) of the i-th switch transition on phase x. Matrix P has been integrated into formula (8).

After solving the above formulated problem, the flux correction is achieved by shifting all the switching transitions by $\Delta t$. i.e. the modified switching sequence 42 is the switching sequence 38 with transition times $t_{xi}$ altered by the time offsets or time shifts $\Delta t_{xi}$.

Figure 17:
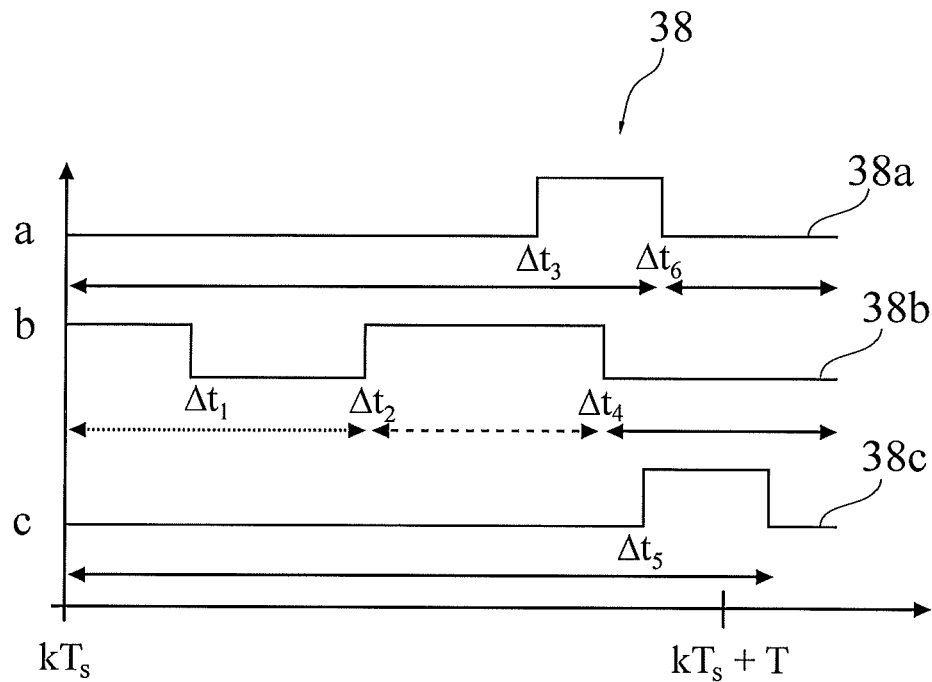
FIG. 17 shows a diagram with a switching sequence for explaining a quadratic programming algorithm according to an exemplary embodiment of the present disclosure.

An example of this is displayed in FIG. 17, with a diagram similar to the diagram of FIG. 6. FIG. 17 shows a diagram with a switching sequence for explaining a quadratic programming algorithm according to an exemplary embodiment of the present disclosure.

FIG. 17 shows a switching sequence 38 with pulse patterns 38a, 38b, 38c for phases a, b, c respectively. Furthermore, in FIG. 17, the current time-instant $kT_s$ and the horizon T of fixed length for optimal control based on QP are shown. The lower and upper bounds (constraints) for the switching instants (the time instants of the switching transitions) are depicted by arrows. Six switching transitions fall within the horizon T.

In (7) $\Delta t$ denotes the vector of switching time corrections $\Delta t_{xi}$. For phase a, for example, the correction of the i-th transition is given by $$\Delta t_{ai} = t_{ai} - t_{ai,ref} \quad (9)$$

where $t_{ai,ref}$ denotes the i-th nominal switching time of the pulse pattern in phase a. Note that the corresponding correction in the switching angle is $\Delta \delta = \omega_e \Delta t$, where $\omega_e$ is bounded by 0 and 1, and $\Delta t$ is given in pu.

The switching times cannot be modified arbitrarily—they are constrained by the current time $kT_s$ and the neighbouring switching transitions in the same phase. For an example based on a two-level inverter, see FIG. 17. The first switching transition in phase b, for example, is constrained to lie between $kT_s$ and the nominal switching instant of the second transition. The second switching transition in phase b can only be delayed up to the nominal switching instant of the third transition in the same phase. Note that the shifting of the transitions in a given phase is done independently from the other phases.

When anticipating pulses, special care needs to be taken. When commanding a switching transition before its scheduled time $t_{ref}$, this also leads to flux corrections at future time-instants up until the nominal switching time has passed, i.e. $kT_s \geq t_{ref}$. in other words, if a time shift correction applied during the current sample time will continue to be applied in the next several sample periods, it must not be recompensated in the upcoming sample periods. Thus, in the next sample period if the nominal scheduled time $t_{ref}$ will not yet occur, the pending correction, $u_{xi} * \Delta t$, will still occur and must be taken into account when determining the next current flux error correction. This will continue until the nominal scheduled time, $t_{ref}$, is passed, i.e. $kT_s \geq t_{ref}$. This future flux correction has to be taken into account, for example by storing it in a buffer, correcting the flux error in step S12 and updating the buffer accordingly.

A second embodiment is an optimal control algorithm based on an approximate QP. Formulating and solving a QP in real-time might be computationally demanding. Yet, the computations can be greatly simplified by considering an approximate QP formulation with the following simplifications and features:

First, consider only one $\Delta t$ per phase (instead of individual time modifications for each switching transition). In other words, per phase the time offsets or shifts $\Delta t_{xi}$ are equal to one $\Delta t_x$.

Second, use an active set QP formulation with two iterations. In an optimization problem with inequality constraints (i.e. with "≥"), the problem can be solved first neglecting these constraints. In a second step, the constraints are imposed and the violated constraints are enforced as equality constraints (i.e. "="), which are then called active constraints.

Specifically, one iteration of the active set QP can be summarized as follows:

In a first step, compute the number of switching transitions for each phase.

In a second step, neglect the timing constraints and compute the unconstrained $\Delta t_x$ per phase.

$$\Delta t_{unconstrained} = \frac{3}{2V_{dc}} \frac{1}{\det(M)} M \Psi_{s,err}, \quad (10)$$

where M is a 3×2 matrix that is a function of the number of switching transitions per phase and the weight q, det(M) is the determinant of M, and $\Psi_{s,err}$ is the stator flux error in the ($\alpha$, $\beta$)-reference frame. (10) is derived from (7), i.e. if the $\Delta t$'s are inserted into (7), the matrix M and the factors cancel the factors and the matrix P in (7).

The evaluation of (10) specifies at most 22 multiplications, 18 additions and one division and is thus computational simple.

In a third step, determine the new switching time instants (i.e. the new switching times) that violate a constraint. These constraints will be so-called active constraints.

Limit the new switching time instants that violate a constraint and fix their values by removing them and their associated switching transitions from the optimization problem. In other words, the switching times that violate a constraint are limited to the border of the constraint. For example, if $t_{ai} \geq 0$ should be applicable, but is not applicable, $t_{ai}$ is set to 0.

After that, compute the flux correction that results from the new switching instants and update the remaining (not yet corrected) flux error accordingly.

After the first iteration, the above iteration is run once again as a second iteration. This procedure with two iterations is computationally not complex. Most importantly, the computational complexity basically does not depend on the number of considered switching transitions, thus it effectively does not depend on the length of the horizon. Specifically, the dimension of the matrix M is always 3×2.

A third embodiment is a deadbeat control algorithm, which can be computationally and conceptually the least complex out of the three control schemes. This deadbeat pulse pattern controller has the following features: The weight q is set to zero. The horizon T is variable and is determined as the minimum time interval starting at the current time $kT_s$ such that at least two phases exhibit switching transitions.

The deadbeat control algorithm will be explained with reference to FIG. 18, which is similar to FIGS. 6 and 17 and shows a diagram with the three-phase, two-level pulse patterns 38a, 38b, 38c, with the current time-instant $kT_s$ and the horizon T of varying length for the deadbeat control. The lower and upper bounds for the switching instants (time instants) are depicted by arrows.

Figure 18:
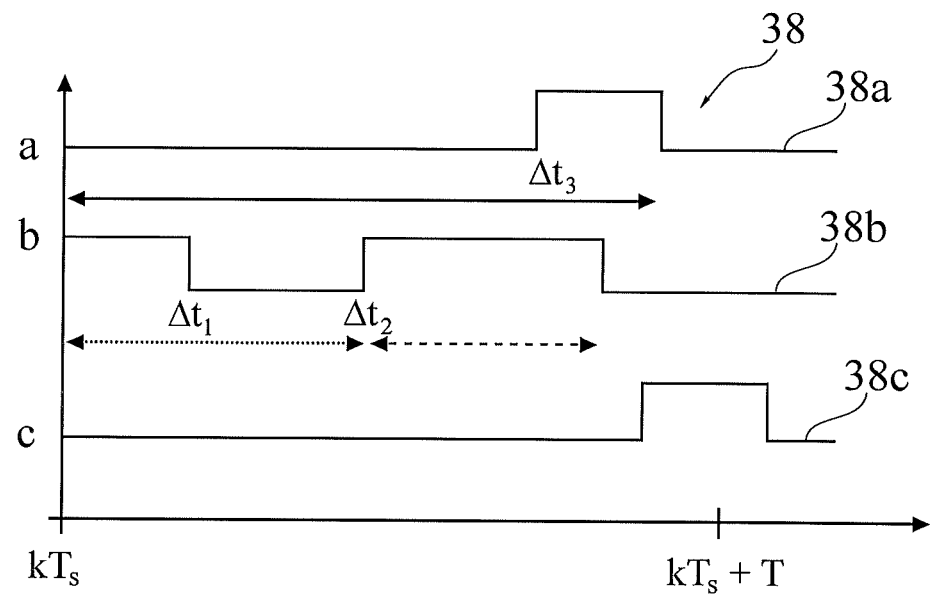
FIG. 18 shows a diagram with a switching sequence for explaining a deadbeat control algorithm according to an exemplary embodiment of the present disclosure.

FIG. 18 shows a diagram with a switching sequence for explaining a deadbeat control algorithm according to an exemplary embodiment of the present disclosure. The deadbeat control algorithm has the following four steps:

In a first step, determine the two phases (in the example: phases a and b) that have the next scheduled switching transitions. This yields the length of the horizon T, which is of variable length for the deadbeat controller. Determine all switching transitions (nominal time-instants and changes in switch position) within the horizon T.

In a second step, translate the stator flux error $\Psi_{s,err}$ from the ($\alpha$, $\beta$)-reference frame to the (a, b, c)-reference frame, where only two out of three phases are active (a and b, a and c, or b and c).

In a third step, compute the specified switching time modification $\Delta t_{req}$ in (a, b, c) for each phase, which is $$\Delta t_{req} = \frac{\Psi_{s,err}}{0.5V_{dc}}, \quad (11)$$

where $\Psi_{s,err}$ is the flux error vector in (a, b, c).

In a fourth step, go through the first phase that has switching transitions within the horizon. For each switching transition in this phase with the nominal switching time $t_{nom}$ and the switching transition $\Delta u$, do the following three sub-steps:

First, set $t_{new} = t_{nom} - \text{sgn}(\Delta u) \cdot \Delta t_{req,i}$, where $\text{sgn}(\Delta u) \in \{-1, +1\}$ denotes the direction in which the respective phase switches, i.e. in positive or negative direction.

Second, constrain $t_{new}$ by imposing the respective constraints on the switching time.

Third, update the specified switching time modification:

$$\Delta t_{req,i} = \Delta t_{req,i} + \text{sgn}(\Delta u) \cdot (t_{new} - t_{nom}). \quad (12)$$

Recall that t is given in pu and $\Delta u$ is in [−1, 1].

In the fourth step, repeat the above procedure for the second phase that exhibits switching transitions.

Since the deadbeat controller aims at removing the stator flux error as quickly as possible and since corrections in the switching times are not penalized, the deadbeat controller tends to be very fast and aggressive. Yet, there is no guarantee that the deadbeat controller fully removes the flux error within the horizon, since the constraints on the switching times have to be respected.

Figure 19:
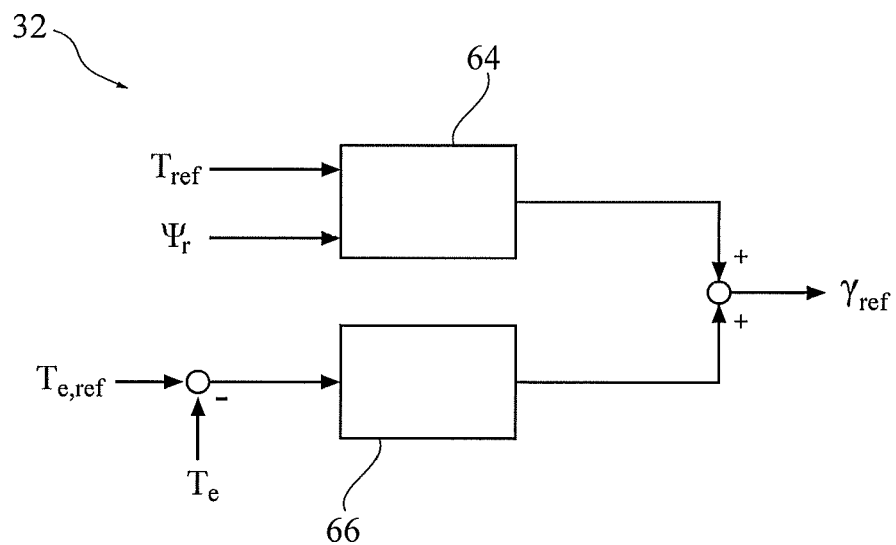
FIG. 19 shows schematically the design of a controller module according to an exemplary embodiment of the present disclosure.
Figure 20:
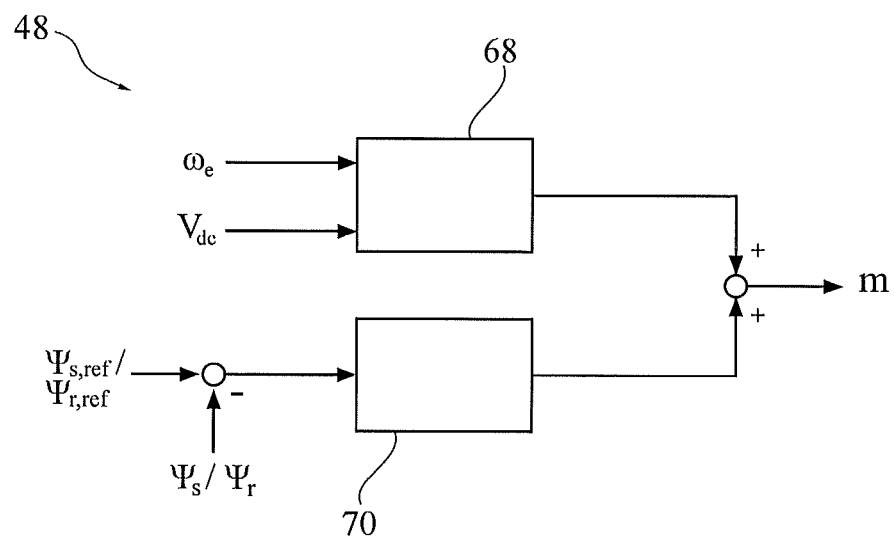
FIG. 20 shows schematically the design of another controller module according to an exemplary embodiment of the present disclosure.

The control method, i.e. the inner MP³C control loop as described above, in particular with reference to FIG. 15, can be augmented or supplemented by outer control loops shown in FIGS. 19 and 20.

FIG. 19 shows schematically the design of a controller module according to an exemplary embodiment of the present disclosure. FIG. 19 illustrates an embodiment of the reference angle module 32. As describe above, the reference angle $\gamma_{ref}$ is based on the reference torque $T_{e,ref}$ and the estimated rotor flux $\psi_r$. $T_{e,ref}$ can be supplied from a speed controller of the motor 14.

A feedforward control submodule 64 for the reference angle $\gamma_{ref}$ uses formula (4) for calculating a feedforward value for the reference angle $\gamma_{ref}$. This feedforward value can be modified by an offset compensation of a slow control submodule 66 for the reference angle $\gamma_{ref}$. The submodule 66 receives or determines the difference of the magnitude of the estimated torque $T_e$ and the magnitude of the reference torque $T_{e,ref}$ and uses the difference value for determining an offset compensation for the reference angle $\gamma_{ref}$, for example with a PI controller.

In such a way, the first control loop shown in FIG. 19 regulates the torque by adjusting the reference angle between the stator and the rotor flux vectors.

FIG. 20 shows schematically the design of another controller module according to an exemplary embodiment of the present disclosure. FIG. 20 illustrates an embodiment of the modulation index module 48. A feedforward control submodule 68 for the modulation index m uses the formula $$m = \omega_e \frac{V_{dc,ref}}{V_{dc}} \Psi_{s,ref} \quad (13)$$

for calculating a feedforward value for the modulation index m. $V_{dc}$ is the estimated DC-link voltage and $V_{dc,ref}$ is the reference DC-link voltage based on which the OPP was computed.

The feedforward value m can be augmented by an offset compensation of a slow control submodule 70 for the modulation index m. The submodule 70 receives or determines the difference of the magnitude of the estimated rotor flux $\psi_r$ and the magnitude of the reference rotor flux $\psi_{r,\,ref}$ and uses the difference value for determining an offset compensation for the modulation index m, for example with a PI controller. Alternatively or additionally, the estimated stator flux $\psi_s$ and the reference stator flux $\psi_{s,\,ref}$ can be used for determining the offset.

In such a way, the second control loop shown in FIG. 20 regulates the rotor (or stator) flux magnitude by adjusting the modulation index m. The slow rotor (or stator) flux controller 70 can thus use some information from the inner loop of the MP³C algorithm to adjust the modulation index m; specifically, the volt-second correction or the effective modulation index.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit can fulfill the functions of several items recited in the claims. The mere fact that certain measures are recited in mutually different dependent claims does not indicate that a combination of these measures cannot be used to advantage. Any reference symbol in the claims should not be construed as limiting the scope.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

| | |
|---|---|
| 10, 10' | electrical system |
| 12 | converter, inverter |
| $V_{DC}$ | DC-link voltage |
| 14 | electrical machine (motor or generator) |
| 16 | converter circuit, switches |
| 18 | controller |
| 20 | grid |
| 22 | transformer and filter |
| 24 | grid impedance |
| 30 | flux estimation module |
| $i_s$ | instantaneous current |
| $v_s$ | instantaneous voltage |
| $\Psi_s$ | estimated stator flux |
| $\Psi_r$ | estimated rotor flux |
| $T_e$ | estimated torque |
| 32 | reference angle module |
| $\gamma_{ref}$ | reference angle |
| $\Psi_{s,\,ref}$ | reference stator flux |
| $T_{e,\,ref}$ | reference torque |
| 34 | reference flux module |
| 36 | OPP pattern selector |
| 38 | selected switching sequence |
| $\Psi_{s,\,err}$ | stator flux error |
| 40 | error minimization module |
| 42 | modified switching sequence |
| 44 | switch position module |
| 46 | sequence of switch positions |
| m | modulation index |
| d | pulse number |
| 48 | modulation index module |
| 50 | optimized pulse pattern |
| 52, 52a, 52b | switching transition |
| 54 | switching angle |
| 56 | voltage level |
| a, b, c | phase |
| 38a, 38b, 38c | pulse pattern for a phase |
| 58 | amplitude of stator flux vector |
| 60 | angle of stator flux vector |
| 62 | trajectory of stator flux vector |
| 64 | feedforward control submodule for the reference angle |
| 66 | slow control submodule for the reference angle |
| 68 | feedforward control submodule for the modulation index |
| 70 | slow control submodule for the modulation index |

What is claimed is:

1. A method for controlling a converter for an electrical system, the method comprising the steps of:
   in a processor:
   generating a switching sequence for the converter from a table of precalculated switching sequences based on an actual state of the electrical system, wherein the switching sequence including a sequence of switching transitions of the converter, wherein each switching transition comprises a transition time;
   determining an estimated flux form the actual state of the electrical system;
   modifying the switching sequence by altering at least one transition time of a switching transition of the switching sequence, such that a flux error based on a difference between the estimated flux of the electrical system and a reference flux of the electrical system is minimized,
   applying the modified switching sequence to the converter.

2. The method of claim 1,
   wherein in step a transition time is altered by adding a time offset to the transitions time,
   wherein the time offset is determined, such that the flux error is at least partly compensated.

3. The method of claim 1,
   wherein an overall time offset is derived from the flux error,
   wherein the overall time offset is distributed to time offsets for transition times, such that constraints on the switching sequence are respected.

4. The method of claim 1,
   wherein time offsets for transition times are determined such that the time offsets are minimized and constraints on the switching sequence are respected.

5. The method of claim 1,
   wherein a time offset for the first switching transition of the switching sequence is determined such that it is as big as possible and constraints on the switching sequence are respected.

6. The method of claim 1,
   wherein in step at least two switching transitions with equal switching times are inserted into the switching sequence before the switching sequence is modified.

7. The method of claim 1,
   wherein the reference flux is determined as a vector in an orthogonal reference frame, wherein an angle of the reference flux vector is based on the sum of an angle of an estimated rotor flux vector and a reference angle, wherein the reference angle is determined from the actual state of the electrical system.

8. The method of claim 1, wherein the reference angle is adjusted by a feedback controller between an estimated value of the actual state of the electrical system and an corresponding reference value.

9. The method claim 1, wherein the magnitude of the flux vector is determined from the angle of the flux vector and the switching sequence.

10. The method of claim 1, wherein in step the switching sequence is selected based on a modulation index of the converter, the modulation index indicating a ratio between an amplitude of an input voltage of the converter and an amplitude of an output voltage of the converter;

wherein the modulation index is adjusted by a feedback controller between an estimated value of the actual state of the system and a corresponding reference value.

11. A non-transitory computer-readable medium that stores a program element for controlling a converter for an electrical system, which when in communicative contact with a computer, the computer-readable medium causes the computer to execute a method of the program element comprising:

in a processor of the computer:
generating a switching sequence for the converter based on an actual state of the electrical system;
determining an estimated flux has been generated from the actual state of the electrical system;
modifying the switching sequence by altering at least one transition time of a switching transition of the switching sequence, such that a flux error based on a difference between the estimated flux of the electrical system and a reference flux of the electrical system is minimized; and
applying the modified switching sequence to the converter.

12. A controller for controlling a converter, comprising:

means for generating a switching sequence for the converter based on an actual state of the electrical system;

means for determining an estimated flux has been determined form the actual state of the electrical system;

means for modifying the switching sequence by altering at least one transition time of a switching transition of the switching sequence, such that a flux error based on a difference between the estimated flux of the electrical system and a reference flux of the electrical system is minimized; and means for applying the modified switching sequence to the converter.

13. A converter, comprising:

a converter circuit with switches for generating an output voltage for at least one phase;

a controller for controlling the switches, the controller including:

means for determining a switching sequence for the converter based on an actual state of the electrical system;

means for determining an estimated flux has been determined form the actual state of the electrical system;

means for modifying the switching sequence by altering at least one transition time of a switching transition of the switching sequence, such that a flux error based on a difference between the estimated flux of the electrical system and a reference flux of the electrical system is minimized; and means for applying the modified switching sequence to the converter.

* * * * *